United States Patent
Brown (10) Patent No.: US 11,180,063 B2
(45) Date of Patent: Nov. 23, 2021

(54) APPARATUS AND METHOD FOR A VEHICLE SEAT

(71) Applicant: JAGUAR LAND ROVER LIMITED, Warwickshire (GB)

(72) Inventor: Christopher Brown, Coventry (GB)

(73) Assignee: JAGUAR LAND ROVER LIMITED, Coventry (GB)

(*) Notice: Subject to any disclaimer, the term of this patent is extended or adjusted under 35 U.S.C. 154(b) by 4 days.

(21) Appl. No.: 16/332,845

(22) PCT Filed: Sep. 26, 2017

(86) PCT No.: PCT/EP2017/074395
§ 371 (c)(1),
(2) Date: Mar. 13, 2019

(87) PCT Pub. No.: WO2018/060204
PCT Pub. Date: Apr. 5, 2018

(65) Prior Publication Data
US 2019/0210500 A1 Jul. 11, 2019

(30) Foreign Application Priority Data
Sep. 28, 2016 (GB) ...................... 1616425

(51) Int. Cl.
*B60N 2/879* (2018.01)
*B60N 2/10* (2006.01)
(Continued)

(52) U.S. Cl.
CPC ............ *B60N 2/879* (2018.02); *B60N 2/206* (2013.01); *B60N 2/757* (2018.02); *B60N 2/829* (2018.02);
(Continued)

(58) Field of Classification Search
CPC ........ B60N 2/856; B60N 3/102; B60N 2/793; B60N 2/879
See application file for complete search history.

(56) References Cited

U.S. PATENT DOCUMENTS 5,660,433 A * 8/1997 Bruhnke ............... B60N 3/107
297/188.17
6,217,112 B1 4/2001 Linsenmeier et al.
(Continued)

FOREIGN PATENT DOCUMENTS

CA 2320231 A1 * 8/1999 ............ B60N 2/206
DE 2246771 A1 * 4/1973 ............ B60N 2/853
(Continued)

OTHER PUBLICATIONS

Combined Search and Examination Report under Sections 17 and 18(3) for Application No. GB1616425.3 dated Mar. 13, 2017.
(Continued)

*Primary Examiner* — Timothy J Brindley
(74) *Attorney, Agent, or Firm* — Carlson, Gaskey & Olds (57) ABSTRACT

Apparatus (10) for a vehicle seat, the apparatus (10) comprising a first supporting means (12) and a second supporting means (14), the first supporting means (12) comprising a storage means (16) and the second supporting means (14) being a headrest comprising a cover (18) for covering the storage means (16), the headrest being arranged to have a deployed condition and a retracted condition, wherein in the deployed condition the storage means (16) in the first supporting means (12) is at least partially uncovered, and in the retracted condition the storage means (16) in the first supporting means (12) is covered by the cover (18).

16 Claims, 5 Drawing Sheets

(51) Int. Cl.
*B60N 3/10* (2006.01)
*B60N 2/20* (2006.01)
*B60N 2/75* (2018.01)
*B60N 2/829* (2018.01)
*B60N 3/00* (2006.01)
*B60R 11/02* (2006.01)
*B60R 16/02* (2006.01)
*B60N 2/891* (2018.01)
*B60R 11/00* (2006.01)

(52) U.S. Cl.
CPC ............. *B60N 3/002* (2013.01); *B60N 3/102* (2013.01); *B60R 11/0241* (2013.01); *B60R 16/02* (2013.01); *B60N 2/891* (2018.02); *B60R 2011/0017* (2013.01); *B60R 2011/0043* (2013.01); *B60R 2011/0082* (2013.01); *B60R 2011/0092* (2013.01)

(56) References Cited

U.S. PATENT DOCUMENTS

| | | | | |
|---|---|---|---|---|
| 9,050,910 | B2 * | 6/2015 | Kim | B60N 2/79 |
| 2006/0006722 | A1 * | 1/2006 | Kim | A47C 1/03 |
| | | | | 297/411.3 |
| 2010/0244502 | A1 | 9/2010 | Andersson et al. | |
| 2016/0001683 | A1 | 1/2016 | Bohlke et al. | |
| 2020/0062156 | A1 * | 2/2020 | Little | B60N 2/829 |

FOREIGN PATENT DOCUMENTS

| | | | | |
|---|---|---|---|---|
| DE | 19543924 C1 * | 12/1996 | | B60N 3/102 |
| DE | 19716054 C1 * | 9/1998 | | B60N 2/832 |
| DE | 102009058389 A1 * | 6/2011 | | B60N 3/105 |
| DE | 10 2014 212881 A1 | 1/2016 | | |
| DE | 102015210975 A1 * | 12/2016 | | B60N 2/757 |
| DE | 102018200186 A1 * | 7/2019 | | B60N 3/102 |
| EP | 0860319 A1 * | 8/1998 | | B60N 2/793 |
| JP | 2006141855 A | 6/2006 | | |
| JP | 2007253669 A | 10/2007 | | |
| JP | 2009090917 A | 4/2009 | | |

OTHER PUBLICATIONS

International Search Report and Written Opinion of the International Searching Authority for International application No. PCT/EP2017/074395 dated Jan. 5, 2018.

* cited by examiner

APPARATUS AND METHOD FOR A VEHICLE SEAT

TECHNICAL FIELD

The present disclosure relates to an apparatus and method for a vehicle seat. In particular, but not exclusively it relates to an apparatus and method for a vehicle seat comprising coverable storage.

Aspects of the invention relate to an apparatus for a vehicle seat, a method of deploying a storage means for a vehicle seat, a computer program, a non-transitory computer readable medium, a vehicle seat and a vehicle.

BACKGROUND

Storage in a vehicle may be provided within an armrest which can occupy a centre seat space of a second row of seating in the vehicle. Such storage may comprise receptacles and beverage holders which are exposed when the armrest is moved from a retracted condition to a deployed condition. Such receptacles and beverage holders may be aesthetically undesirable and/or physically inconvenient, especially when the armrest is merely required for a user to rest an arm thereupon.

It is an aim of the present invention to address disadvantages associated with the prior art.

SUMMARY OF THE INVENTION

Aspects and embodiments of the invention provide an apparatus for a vehicle seat, a method of deploying a storage means for a vehicle seat, a computer program, a non-transitory computer readable medium, a vehicle seat and a vehicle as claimed in the appended claims.

According to an aspect of the invention there is provided an apparatus for a vehicle seat, the apparatus comprising a first supporting means and a second supporting means, the first supporting means comprising one of a storage means and a cover for covering a storage means, the second supporting means comprising the other of the storage means and the cover for covering the storage means, the second supporting means being arranged to have a deployed condition and a retracted condition, wherein in the deployed condition the storage means is at least partially uncovered and in the retracted condition the storage means is covered by the cover. The deployed condition may be considered as an extended condition, or as an in-use condition.

An advantage of the invention is that the storage in the vehicle seat may be covered when not in use such that the vehicle seat is discrete and aesthetically appealing to a user of the vehicle. An advantage of the invention is that the storage in the vehicle seat may be covered when not in use such that the storage means does not interfere with the operation of the first supporting means to operate as a support for a vehicle user.

The second supporting means may be a headrest. The first supporting means may comprise a first end and a second end, with a first axis defined therebetween. The first axis may be defined such that the first end and the second end both lie along the first axis. The first end and the second end may be opposite ends of the first supporting means. The term 'end' is not meant to be necessarily limiting to a furthest extremity of the first supporting means from a centre point of the first supporting means along the first axis, but to a region of the first supporting means from the centre point of the first supporting means to the furthest extremity of the first supporting means along the first axis.

In some embodiments of the invention the second supporting means may be located at and/or at least partially beyond the second end of the first supporting means along the first axis, when the second supporting means is in the retracted condition. In some embodiments of the invention the storage means may be located at least partially beyond the second end of the first supporting means along the first axis from the centre point of the first supporting means when the second supporting means is in the deployed condition. This provides access for a user to the storage means when the second supporting means is in the deployed condition. In some embodiments of the invention, the storage means may be located at least partially between the centre point of the first supporting means and an extremity of the second end of the first supporting means, along the first axis, when the second supporting means is in the retracted condition.

In an embodiment of the invention the first supporting means only has either a storage means or a cover for the storage means.

According to an aspect of the invention there is provided apparatus for a vehicle seat, the apparatus comprising a first supporting means and a second supporting means, the first supporting means comprising a storage means and the second supporting means being a headrest comprising a cover for covering the storage means, the headrest being arranged to have a deployed condition and a retracted condition, wherein in the deployed condition the storage means in the first supporting means is at least partially uncovered, and in the retracted condition the storage means in the first supporting means is covered by the cover.

An advantage of the invention is that the storage in the vehicle seat may be covered when not in use such that the vehicle seat is discrete and aesthetically appealing to a user of the vehicle. An advantage of the invention is that the storage in the vehicle seat may be covered when not in use such that the storage means does not interfere with the operation of the first supporting means to operate as a support for a vehicle user.

The first supporting means may be an arm support such as an armrest when the first supporting means is in a deployed condition. This allows a user to rest an arm on the first supporting means when the first supporting means is in the deployed condition. The first supporting means may be a back support such as a backrest when the first supporting means is in a retracted condition. This allows a user to rest a back on the first supporting means when the first supporting means is in the retracted condition. The second supporting means may be a head support such as a headrest, which may also be called a seat headrest. The second supporting means may only provide head support when the first supporting means is in a retracted condition.

The first supporting means may comprise a first end arranged to be operably connected to the vehicle seat, and a second end, distal from the first end, along a first axis. The headrest may be arranged to be operably connected to the second end of the first supporting means, by a first connecting means parallel to the first axis. Thereby, the first connecting means may provide for movement of the headrest along the first axis.

The first connecting means may be operably connected to a first member of an actuation mechanism to provide linear movement of the first connecting means in or along the first axis. For example, the actuation mechanism may be a linear actuation mechanism to provide linear movement of the first connecting means in or along the first axis. This provides the advantage of providing adjustment to the headrest without manual manipulation of the headrest.

The first connecting means may be linearly moved by actuation of a motor connected to a second member of the linear actuation mechanism.

In an embodiment of the invention, the first member of the linear actuation mechanism may be an internally threaded component arranged to engage with an externally threaded component. The linear actuation mechanism may comprise a second member which is an externally threaded component, for example an elongated threaded bar or rod, arranged to engage with the internally threaded component. The second member may be connected to driving means. The driving means may be a motor. The motor may provide actuation of the first member, the first connecting means and the second member. The first member and the first connecting means may move linearly along or parallel to the first axis when actuated. The second member may remain longitudinally stationary along the first axis when actuated. The second member may rotate around its longitudinal axis, which axis may be the first axis, such that the external threads of the second member engage with the internal threads of the first member. This provides the advantage of fine control of the positioning of the headrest with respect to the rest of the vehicle seat.

The first connecting means may comprise one or more rod, pole, shaft or stem.

When the headrest is in the deployed condition the headrest may be extended from the first supporting means along the first axis. That is, the headrest in the deployed condition is displaced from the position of the headrest in the retracted condition.

The first supporting means may comprise a second connecting means, at the first end of the first supporting means, arranged to operably connect the first supporting means to the vehicle seat, and wherein the second connecting means is arranged to allow rotation of the first supporting means about a second axis.

The first supporting means may be arranged to have a deployed condition and a retracted condition, the first axis of the first supporting means being substantially horizontal when in the deployed condition, and the first axis of the first supporting means being rotated in the second axis between ninety degrees and one hundred and eighty degrees from the deployed condition, when in the retracted condition.

For example, when in the retracted condition, the first supporting means may be ninety degrees rotated from position of the first supporting means when in the deployed condition, that is, to be substantially perpendicular to its position in the deployed condition. In some examples the first supporting means may be between ninety and one hundred and thirty five degrees rotated from the first axis when in the deployed condition.

The first supporting means may be substantially vertical in the retracted condition. The first supporting means may be positioned in the retracted condition to support the back of a vehicle user, or passenger, when the vehicle user is sat on the vehicle seat comprising the first supporting means.

In the deployed condition the first supporting means may provide support for a passenger's arm and in the retracted condition the first supporting means may provide support for a passenger's back. In other words, the first supporting means is arranged as an armrest when in the deployed condition and the first portion is arranged as a seat back, or backrest, when in the retracted condition.

When the first supporting means is in the retracted condition the headrest may be deployed and/or adjusted by detection of a user input. The deployment of the headrest may be effected manually or automatically. The deployment of the headrest may be effected by manual manipulation by a user.

The headrest may be deployed in response to, or in dependence upon, the detection, by user detection means, of a person being positioned at the location of the first supporting means. The deployment in this instance may be automatic. This provides the advantage of effecting the user input by a user being positioned at the location of the first supporting means, for example at a centre seat in a second row of vehicle seats. Advantageously, automatic deployment of the headrest reduces or removes the requirement for the user to effect manual deployment or adjustment of the headrest.

The user detection means may be one or more of a pressure sensor, camera sensor or proximity sensor. Other user detection or detecting means may be used.

The user input may be provided by a user via user input means such as a switch, button, gesture control detector, resistive sensor, capacitive sensor or pressure sensor. Other user input means may be used. The user input means may be located on or near to the headrest or at some other accessible position for the user when the user is located in the seat comprising the apparatus or a seat adjacent the apparatus.

Alternatively, or in addition, user input means may be located near to or accessible to a driver or passenger when not located in the seat comprising the apparatus or a seat adjacent the apparatus such that remote operation of the apparatus can be effected. Therefore the driver of the vehicle in which the apparatus is located may effect operation of the apparatus from the driver's seat, where the driver's seat is in row one of the seating of the vehicle, and the apparatus is comprised in row two, or a further row, of the seating of the vehicle. This provides the advantage of the user being able to control the height of the headrest to optimise passenger safety and the vehicle driver's visibility to the area outside of the vehicle, in particular to the rear of the vehicle. In other embodiments of the invention, the user input may be provided remotely from the vehicle, such as by a user input on a mobile device, such as a mobile phone, smart watch, tablet or laptop.

When the first supporting means is in the deployed condition the headrest may be deployed and/or adjusted by detection of a user input. The deployment of the headrest may be effected manually or automatically. For example the headrest may be deployed by manual manipulation of the headrest, or by an actuation mechanism.

The headrest may be deployed in response to, or in dependence upon, the detection, by deployment detection means, of the lowering of the first supporting means towards or into the deployed condition. This provides the advantage of automatically deploying the headrest. Automatic deployment of the headrest may depend on the angle of the first supporting means in relation to the position of the first supporting means in the retracted and/or deployed condition. Automatic deployment of the headrest may require the first supporting means to be in a deployed condition, which may be a fully deployed condition. The apparatus may comprise an angle detecting or detection means for detecting the angle of the first supporting means, or a simple switch to effect the detection of the first supporting means being moved to or beyond a threshold angle from the retracted condition or to a fully deployed condition.

The user input may be provided by a user via user input means. The user input means may be a switch, button, gesture control detector, resistive sensor, capacitive sensor or pressure sensor. Other user input means may be used. The user input means for deployment of the headrest when the first supporting means is in the retracted condition may be the same as, or may be different from, the user input means for deployment of the headrest when the first supporting means is in the deployed condition. In some embodiments, a first user input means may be provided when the first supporting means is in the retracted condition and a second user input means may be provided when the first supporting means is in the deployed condition. In other embodiments of the invention, the user input may be provided remotely from the vehicle, such as by a user input on a mobile device, such as a mobile phone, smart watch, tablet or laptop.

The apparatus may comprise sensing means, wherein the sensing means may be operable when the first supporting means is in the deployed condition to prevent operation of the cover if an object is detected in the path of the cover. This provides the advantage of preventing retraction of the headrest back towards the first supporting means, when to do so would trap a user's fingers or a stored object. In some embodiments the sensing means may also be operable when the first supporting means is in the retracted condition. The sensing means may be a pinch sensor, to detect pressure or a force applied thereto, touch sensor to detect a capacitance or voltage change therein, or an optical sensor, to detect the presence of an object in an optical pathway. Other sensors may be used to detect the presence of an object in the path of the cover.

The storage means may be storage to store objects or stowage to stow objects. The storage means may be a receptacle. The receptacle may comprises one or more of a beverage holder, a mobile device caddy, and a tray. The receptacle may comprise a wired or wireless charging means for charging a mobile device. Such a mobile device may be a device such as a mobile phone, smart watch, tablet, laptop, or other electronic device with a battery which may require charging. The wireless charging means may be an induction charger. Wired charging could be provided by an electrical power connection such as a 12 Volt connection, or a 5 Volt connection which may be a universal serial bus (USB) connection.

According to an aspect of the invention there is provided a method of deploying a storage means for a vehicle seat comprising: receiving a user input to deploy a second supporting means, wherein the second supporting means is a headrest comprising a cover for covering the storage means, the storage means being comprised in a first supporting means, and wherein the storage means is at least partially uncovered in response to, or in dependence upon, the receipt of the user input.

According to an aspect of the invention there is provided a method of deploying a storage means for a vehicle seat comprising: receiving a first user input to deploy a first supporting means, wherein the first supporting means comprises a storage means; and receiving a second user input to deploy a second supporting means, wherein the second supporting means is a headrest comprising a cover for covering the storage means, and wherein the storage means is at least partially uncovered in response to, or in dependence upon, the receipt of the second user input.

According to an aspect of the invention there is provided a computer program comprising instructions that, when executed by a processor, cause an apparatus to perform the method as defined in the preceding paragraphs.

According to an aspect of the invention there is provided a non-transitory computer readable medium comprising the computer program as defined in the preceding paragraphs.

According to an aspect of the invention there is provided a vehicle seat comprising the apparatus as defined in the preceding paragraphs.

The vehicle seat may be a seat bench or part thereof, which may form at least part of a second row of seating in a vehicle. Alternatively, or in addition, the vehicle seat may form at least part of a third row and/or further rows of seating of the vehicle.

According to an aspect of the invention there is provided a vehicle comprising an apparatus as defined in the preceding paragraphs, or a vehicle seat as defined in the preceding paragraphs.

According to an aspect of the invention there is provided apparatus for a vehicle seat, the apparatus comprising a first support and a second support, the first support comprising a receptacle and the second support being a headrest comprising a cover for covering the receptacle, the headrest being arranged to have a deployed condition and a retracted condition, wherein in the deployed condition the receptacle in the first support is at least partially uncovered, and in the retracted condition the receptacle in the first support is covered by the cover.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Examples of the present disclosure relate to storage in a vehicle seat. Some examples of the disclosure relate to storage in an armrest of a second row of vehicle seats. Non-limiting examples will now be described with reference to the accompanying drawings.

The figures illustrate an apparatus 10 for a vehicle seat. The apparatus 10 comprises a first supporting means 12 and a second supporting means 14, the first supporting means 12 comprising a storage means 16 and the second supporting means 14 being a headrest comprising a cover 18 for covering the storage means 16, the headrest 14 being arranged to have a deployed condition and a retracted condition. In the deployed condition the storage means 16 in the first supporting means 12 is at least partially uncovered, and in the retracted condition the storage means 16 in the first supporting means 12 is covered by the cover 18.

Figure 7:
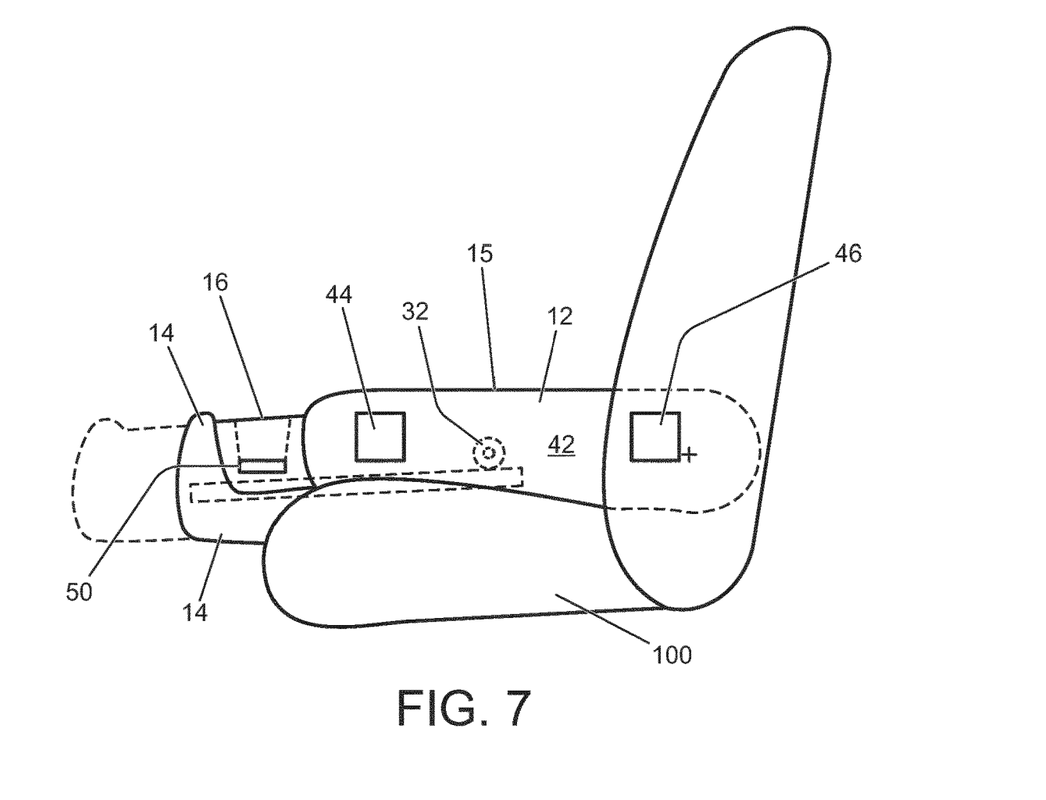
FIG. 7 illustrates an example of a vehicle seat.
Figure 8:
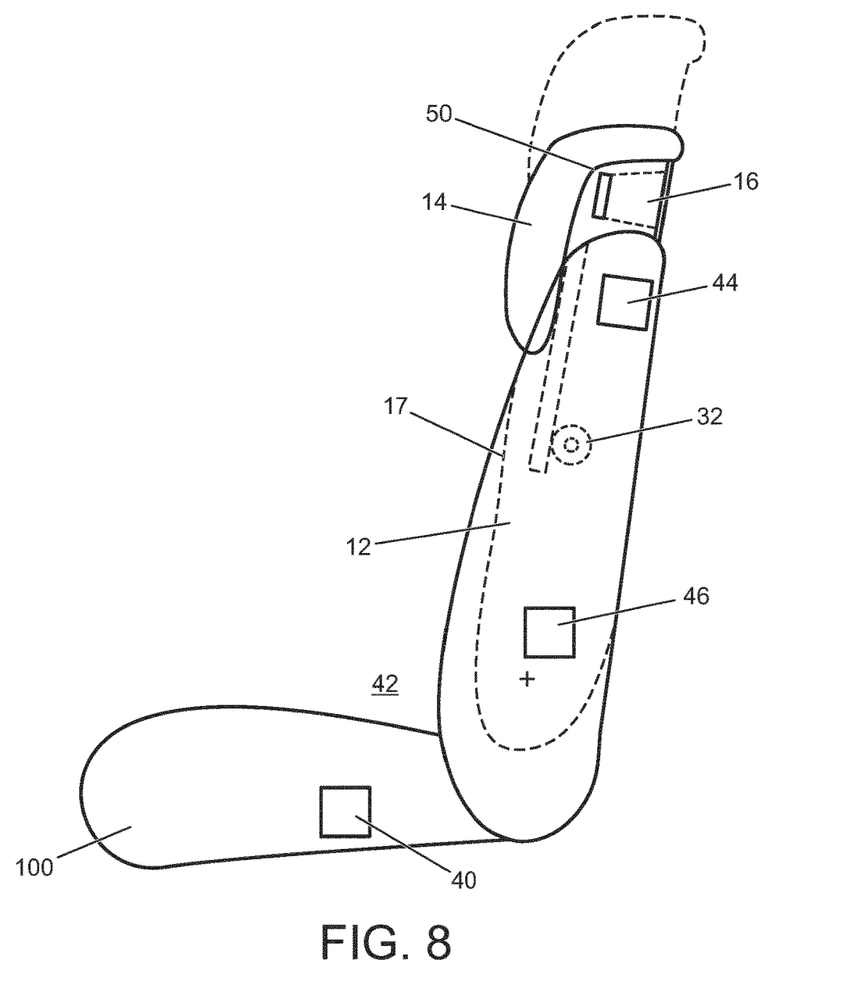
FIG. 8 illustrates an example of a vehicle seat.
Figure 11:
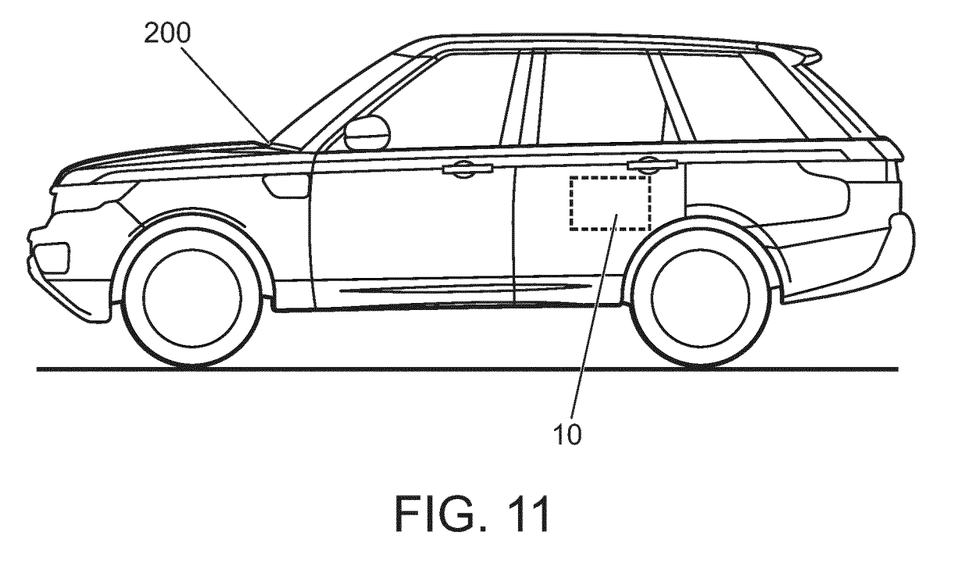
FIG. 11 illustrates an example vehicle.

FIGS. 1 to 5 schematically illustrate an apparatus 10 comprising first supporting means 12 in the form of an armrest or backrest which may form part of a vehicle seat arrangement 100 in a vehicle 200, as shown in FIGS. 7, 8 and 11. This may be considered to be, or form part of, the body or back of the seat. In particular, vehicle seats in any of row two, row three and subsequent rows of seating may be in the form of a bench seat. Such bench seats may be designed to allow multiple passengers to occupy the seating. For example, row two seating of the vehicle 200 may be designed to allow occupation by three passengers. In such an arrangement the centre seat 100 may have a backrest for the centre seat occupant which may be deployed to form an armrest for passengers on seats adjacent the centre seat, allowing two passengers to occupy the seating with an armrest therebetween.

The first supporting means 12 has a first end 20 and a second end 22 spatially separated along a first axis 24. The first end 20 is arranged to be operably connected to another portion of a vehicle seat 100 via a pivotal arrangement 36 allowing pivoting of the first supporting means 12 in a second axis 38. The second axis 38 may be perpendicular to the first axis 24. When in a retracted condition the first supporting means 12 forms a backrest for a seat 100, for example the centre seat of a second row of seating in a vehicle 200, where the second row of seating may provide seating for three passengers. In such a condition a passenger may be seated at the location 42 of the first supporting means 12. When in a deployed condition, the first supporting means 12 forms an armrest at the location 42 of the first supporting means 12. This prevents a passenger from sitting in the centre seat of the second row of seating in the vehicle 200, but provides an armrest for passengers either side of the location 42 of the first supporting means 12. When in a deployed condition, the first supporting means 12 has an exposed armrest surface 15. When in a retracted condition, the first supporting means 12 has an exposed backrest surface 17.

The first supporting means 12, when in the retracted condition may provide a reclined position, and may in some examples be between ninety and one hundred and thirty five degrees rotated from the deployed condition, where the first supporting means 12 lies in the first axis 24 which is substantially horizontal in the deployed condition. In some examples the retracted condition of the first supporting means 12 may allow positioning of the first supporting means 12 up to one hundred and eighty degrees rotated from the deployed condition. That is, the first supporting means 12 may be substantially horizontal in the retracted condition. The first supporting means 12 in the retracted condition may be substantially in line or flush with the remainder of the seat back of the vehicle seat 100 or seat bench.

Figure 1:
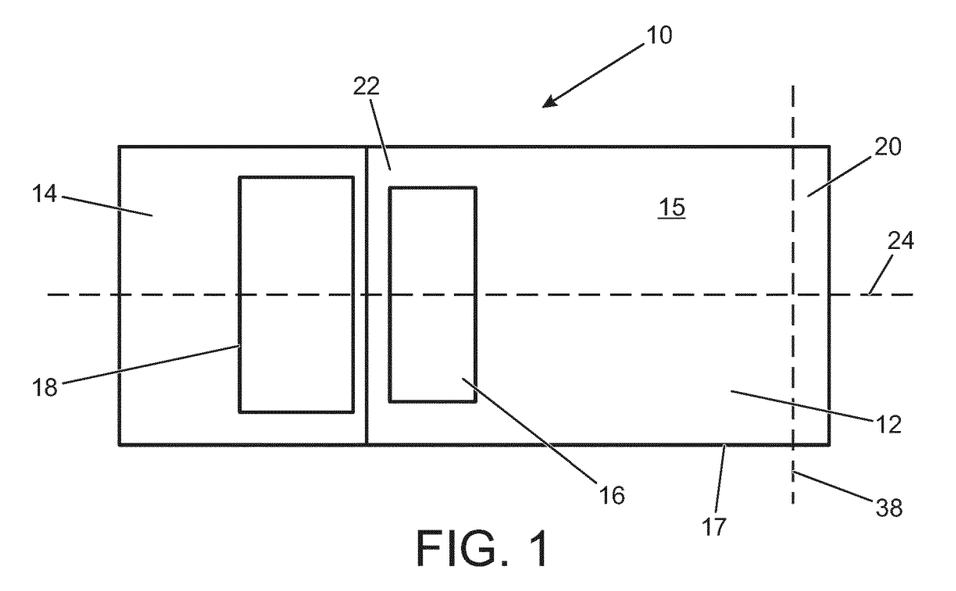
FIG. 1 illustrates a schematic view of an apparatus with a second supporting means in a deployed condition.

In FIG. 1 the apparatus also has a second supporting means 14 in the form of a headrest which may form part of a vehicle seat arrangement 100 in a vehicle 200. In FIG. 1 the headrest 14 is in a deployed condition, that is, it is extended away from the first supporting means 12 in, or parallel to, a first axis 24 when compared to the position of the headrest 14 when in a retracted condition, which is shown in FIG. 2 and which will be described further below.

The headrest 14 comprises a cover means 18 in the form of a cover 18, which is a portion of the headrest 14 which is intended to cover or conceal a storage means 16 in the first supporting means 12 only when the headrest 14 is in the retracted condition. The cover 18 may not be visibly different to the remainder of the headrest 14, such that when the headrest 14 is in the retracted condition, there is no visible indication of the presence of any storage means 16. The storage means 16 may be located between a centre point of the first supporting means 12 and an extremity of the first supporting means 12 at the second end 22, along the first axis 24.

In some examples, as illustrated in FIG. 1, the cover 18 does not overlay or overlap the storage means 16, in the first axis 24, when the headrest 14 is in the deployed condition. In some examples, the cover 18 may partially overlay or overlap the storage means 16, in the first axis 24, when the headrest 14 is in the deployed condition. This may allow for a larger storage means 16 within the available space of the first supporting means 12 and the vehicle 200 itself.

Figure 2:
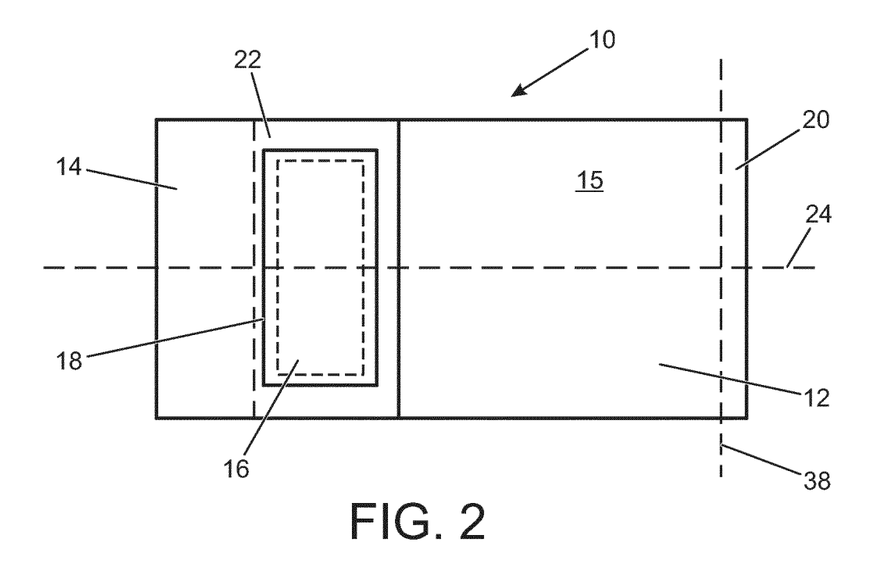
FIG. 2 illustrates a schematic view of an apparatus with a second supporting means in a retracted condition.

In FIG. 2 the headrest 14 is in a retracted condition. In the retracted condition the cover 18 of the headrest 14 overlaps or overlays a portion of the second end 22 of the first supporting means 12 in the first axis 24, which portion comprises the storage means 16.

In other examples, the storage means 16 may be comprised in the headrest 14 and the cover 18 comprised in the first supporting means 12, such that when the headrest 14 is deployed the storage means 16 is at least partially uncovered and when the headrest 14 is retracted the storage means 16 is covered by the cover 18. In some examples, where the storage means 16 is comprised in the headrest 14, the storage means 16 will not overlap or overlay the first supporting means 12 in the first axis 24 when the headrest 14 is in the deployed condition.

Figure 3:
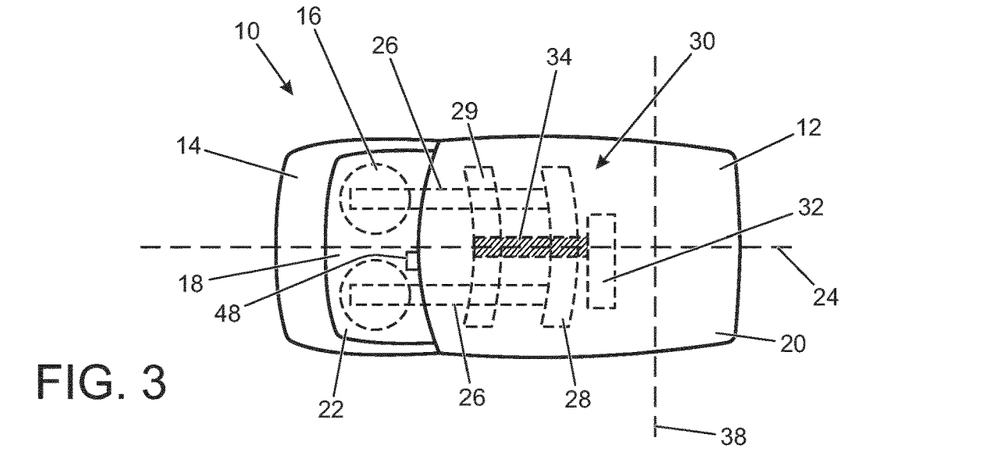
FIG. 3 illustrates a plan view of an example of an apparatus with a second supporting means in a retracted condition.
Figure 4:
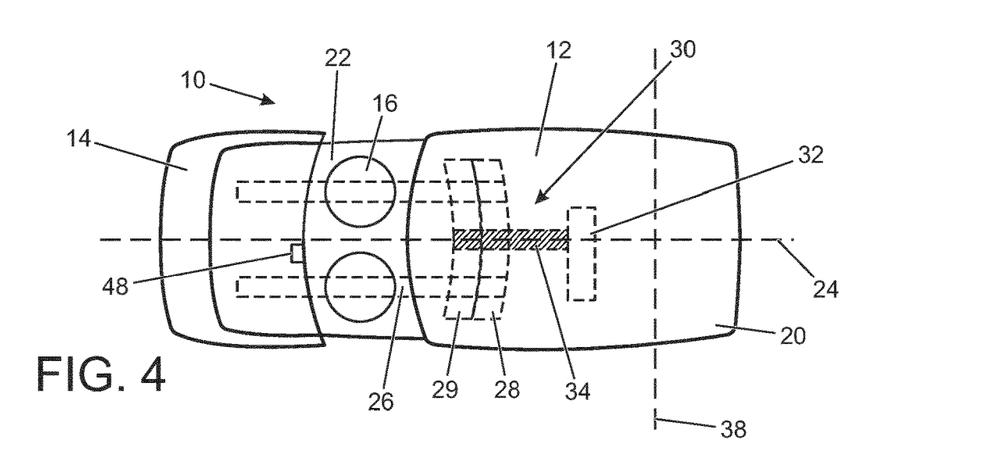
FIG. 4 illustrates a plan view of an example of an apparatus with a second supporting means in a deployed condition.
Figure 5:
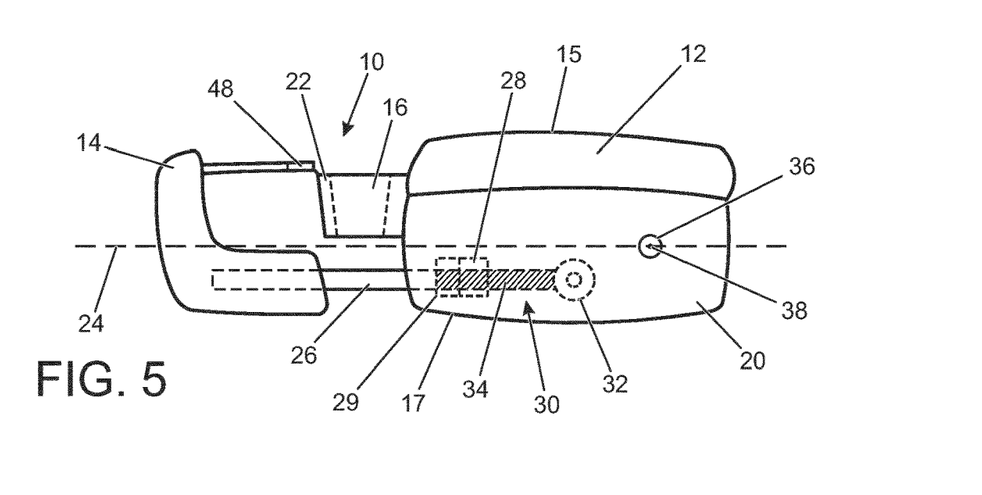
FIG. 5 illustrates a side view of the apparatus of FIG. 4.

FIGS. 3, 4 and 5 illustrate an example apparatus with an actuation mechanism 30 to provide movement of the headrest 14 in relation to the first supporting means 12. FIG. 3 is a plan view of the apparatus 10 when the headrest 14 is in the retracted condition. FIG. 4 is a plan view of the apparatus 10 when the headrest 14 is in the deployed condition. FIG. 5 is a side view of the apparatus shown in FIG. 4.

In FIG. 3 the first supporting means 12 is operably connected to the headrest 14 by first connecting means 26. The first connecting means 26 may comprise a rigid support being one or more rod, pole, shaft or stem. In the example of FIG. 3 there are two first connecting means 26 in the form of rods 26. The rods 26 operably connect the headrest 14 to the first supporting means 12 via an actuation mechanism 30. The actuation mechanism 30 provides linear movement of the rods 26 in or along the first axis 24 thereby providing linear movement of the headrest 14 along the first axis 24. In the example of FIG. 3, the actuation mechanism 30 is a linear actuation mechanism which provides linear movement of the headrest 14 along the first axis 24. However, in other embodiments, the movement may be non-linear effected, for example, by curved rods 26.

The rods 26 are connected to a first member 28 of the linear actuation mechanism 30. The rods 26 may be connected to the first member 28 via any known connection means, such as nut and bolt arrangement, a detent mechanism, welding, adhesive, or a combination of different connection means. In this example the first member 28 is an internally threaded member, which may be for example a metal block with an internally threaded portion, the internally threaded portion being arranged to receive a second member 34 of the linear actuation mechanism 30. The second member 34 in the example of FIG. 3 is an externally threaded member such as a threaded shaft, which may be of a similar metal construction to the internally threaded member 28. By using metal constructions, such as aluminium or steel, the strength and robustness of the components of the apparatus 10 may be provided to withstand any forces expected in normal use, which may include accident conditions. However, other materials, such as carbon fibre, may be used dependent on their mechanical properties and suitability for use in a headrest 14 mechanism.

The externally threaded member 34 is connected to a driving means 32, such as a motor. When energised, the motor 32 rotates the externally threaded member 34. The externally threaded member 34 rotates within the internally threaded member 28 and causes the internally threaded member 28 to travel linearly in, or parallel to, the first axis 24 by engagement of the internal threads of the internally threaded member 28 with the external threads of the externally threaded member 34. The linear movement of the internally threaded member 28 causes the operably connected rods 26 to also travel linearly in, or parallel to, the first axis 24, causing the headrest 14 to move in, or parallel to, the first axis 24.

Therefore by energisation of the motor 32, actuation of the linear actuation mechanism 30 causes the headrest 14 to move from the retracted condition shown in FIG. 3 to the deployed condition shown in FIGS. 4 and 5. In the deployed condition the headrest 14 is displaced from its position in the retracted condition away from the first supporting means 12, in, or parallel to, the first axis 24. Optionally a stop means 29 in the form of a stop, which is rigidly fixed in position within the first supporting means 12, may be used to prevent movement of the headrest 14 beyond a desired maximum deployment extension of the headrest 14. The maximum deployment extension may be defined by the requirements for exposing the storage means 16 for user access and/or requirements for extension of the headrest 14 to provide head support for a passenger.

Energisation of the motor 32 in an opposite sense may then cause the headrest 14 to move from the deployed condition shown in FIGS. 4 and 5 to the retracted condition shown in FIG. 3.

The deployment and retraction of the headrest 14 may be effected by detection of a user input to a user input means 44, and/or by detection of a user via user detection means 40, and/or by detection of deployment of the first supporting means 12 via deployment detection means 46. The effecting of the deployment and retraction of the headrest 14 is described in further detail below.

In some alternative examples, not illustrated herein, the actuation mechanism 30 may be provided by alternative arrangements.

In one alternative example, the first member 28 is a rack of a rack and pinion arrangement, where the second member 34 comprises the pinion of the rack and pinion arrangement. The pinion of the rack and pinion arrangement is then operably connected to a motor 32 to rotate the pinion. The rack is operably connected to the first connecting means 26 to effect linear movement of the first connecting means 26 and therefore the headrest 14.

In another alternative example, the first member 28 is a worm of a worm drive arrangement, where the second member 34 comprises the worm gear of the worm drive arrangement. The worm gear of the worm drive arrangement is then operably connected to a motor 32 to rotate the worm gear. The worm is operably connected to the first connecting means 26 to effect linear movement of the first connecting means 26 and therefore the headrest 14.

In another alternative example, the actuation mechanism foregoes actuation by a motor and instead is a hydraulic or pneumatic arrangement, where the first connecting means 26 is operably connected to, or forms part of, a piston of the hydraulic or pneumatic system. The piston can then be actuated to effect movement of the first connecting means 26 and therefore the headrest 14.

In some examples, the deployment of the first supporting means 12 from the retracted condition to the deployed condition may be alternatively or additionally effected by manual manipulation by a user, for example by a passenger positioned adjacent to the location 42 of the first supporting means 12. In some examples, the deployment of the headrest 14 from the retracted condition to the deployed condition may be alternatively or additionally effected by manual manipulation by a user, for example by a passenger positioned in, or adjacent to, the location 42 of the first supporting means 12 to which the headrest 14 is operably connected.

In FIG. 5 the first supporting means 12 comprises a second connecting means 36, at the first end 20 of the first supporting means 12. The second connecting means 36 may be a hinged or pivotal arrangement which is arranged to operably connect the first supporting means 12 to the vehicle seat 100 to allow the first supporting means 12 to move, in particular to alter the angle of the first supporting means 12 in relation to the vehicle seat 100. In FIG. 5 a pivotal arrangement 36 is arranged to allow rotation of the first supporting means 12 about a second axis 38. The pivotal arrangement 36 may comprise a pivot mechanism having an axial rod or bolt which connects to, or through a collar, to affix the first supporting means 12 to the vehicle seat 100. The collar may have or provide bearing surfaces which may comprise a cylindrical bearing.

Also illustrated in the example of FIGS. 3, 4 and 5 is a sensing means 48 for detecting objects in the path of the cover 18, to prevent the headrest 14 from moving to a retracted condition if an object, such as a stored object or a user's fingers, are located in the path of the cover 18. In some examples, the sensing means 48 is a pinch sensor to detect a force applied thereto. The pinch sensor is sometimes called an anti-pinch sensor as the purpose of such a sensor is to avoid pinch of an object. When an object comes into contact with the pinch sensor the increased force measured by the pinch sensor causes the actuation mechanism 30 to stop the motion of the headrest 14, and may reverse the direction of motion of the headrest 14 to effect either a small reverse movement of the headrest 14 or a complete redeployment of the headrest 14.

In another example, the sensing means 48 is a touch sensor detecting capacitance or voltage change. Such examples may be more effective at detecting user's fingers rather than stored objects.

In another example, the sensing means 48 is an optical sensor which may detect the presence of a foreign object, such as a stored object or user's fingers in an optical pathway. The optical pathway may be defined by a transmitter and receiver arrangement. In examples, one of the transmitter or receiver is on one of the first supporting means 12 or the headrest 14, and the other of the transmitter or receiver is on the other of the first supporting means 12 or the headrest 14. In some examples the transmitter and receiver may both be on one of the first supporting means 12 or the headrest 14, with a mirror arrangement on the other of the first supporting means 12 or the headrest 14.

In the examples shown in FIGS. 3, 4 and 5, the storage means 16 comprises two receptacles, which in this example are beverage holders. In other examples the storage means 16 may comprise one or more receptacles, where the receptacles are arranged to store objects. The one or more receptacles may define separate beverage holders, or may define a caddy for a mobile device, such as a mobile phone, and may in some examples comprise a wired or wireless charging means 50 in the form of a wired or wireless charger for charging one or more mobile device. Wireless charging may be effected by incorporation of induction charging means, such as one or more induction charging coils.

Figure 6:
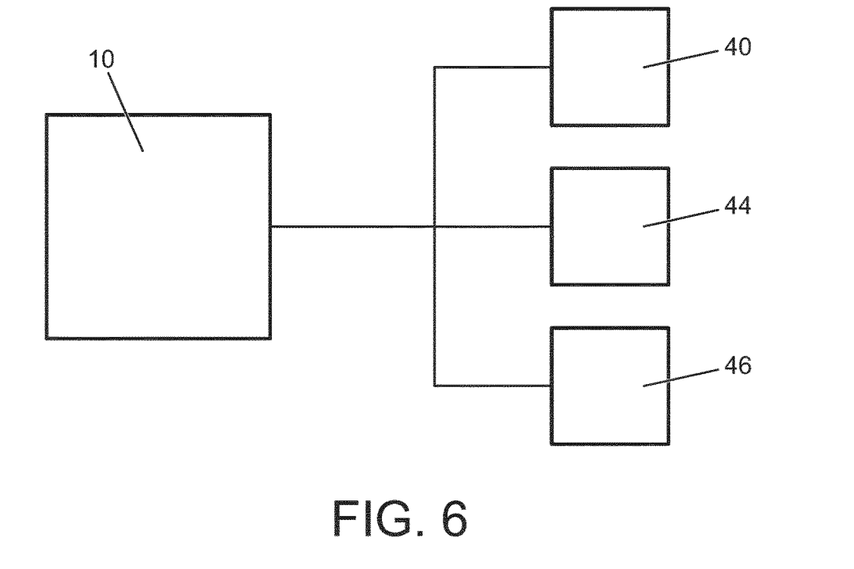
FIG. 6 illustrates a schematic of a sensor arrangement of the apparatus.

FIG. 6 illustrates a schematic of a sensor arrangement or network which may form part of an automated or semi-automated system for controlling the vehicle seat apparatus 10. The sensor arrangement in the illustrated arrangement provides a user detection means 40, a user input means 44 and a deployment detection means 46. In some examples one or more of these components may be omitted. For example, some embodiments may only have a user input means 44, which may be used to deploy and/or adjust the headrest 14 when the first supporting means 12 is in the deployed and/or retracted condition.

The sensor arrangement shown in FIG. 6 allows for automated or automatic deployment and retraction of the headrest 14 in certain conditions or in response to, or in dependence upon, certain inputs into the sensor network. The various sensors may be operable when the first supporting means 12 is in, or is being moved to, the retracted and/or deployed condition, as is to be appreciated from the following description.

The user detection means 40 may be operable when the first supporting means 12 is in the retracted condition. That is, the user detection means 40 may be operable when the first supporting means 12 forms part of a seat backrest. When the first supporting means 12 is in the retracted condition, the positioning of a user, such as a vehicle occupant or passenger, in the location 42 of the first supporting means 12, causes the headrest 14 to be deployed automatically. That is, the headrest will deploy when a passenger sits on the seat 100 which comprises the apparatus 10.

The user detection means 40 may take the form of a sensor, such as a pressure sensor, which may be mounted in the seat 100, a camera sensor, which may detect the location and/or size of a passenger, or a proximity sensor, which may detect the location and/or size of a passenger. In certain embodiments the headrest 14 may be deployed to a position suitable for the size of the passenger. This may be particularly suited to user detection means 40 which can ascertain the position of the head of a passenger, and so may be particularly suited to optical sensing means, such as a camera sensor.

The deployment detection means 46 may be a sensor or sensor arrangement and be operable when the first supporting means 12 is in the deployed condition or position, or when the first supporting means 12 is lowered towards the deployed condition or position. When being lowered, the extension of the headrest 14 from the first supporting means 12 may be fully actuated once the first supporting means 12 is at a certain angle from full deployment, for example twenty degrees from the deployed, or fully deployed condition, or ten degrees from the deployed, or fully deployed, condition. Such a threshold angle may be determined using an angle detecting, or detection, means in the form of an angle sensor, or by means of a switch or sensor activated at the threshold angle.

Alternatively, when being lowered, the extension of the headrest 14 from the first supporting means 12 may be dependent upon the angle of the first supporting means 12 in relation to the fully deployed condition; such that the headrest 14 is extended further from the first supporting means 12 as the first supporting means 12 approaches the fully deployed condition. In such an embodiment the angle of the first supporting means 12 may be determined using an angle detecting, or detection, means, or by means of a plurality of switches or sensors activated at different threshold angles. In certain embodiments, the headrest 14 is not deployed at all until the first supporting means 12 reaches the fully deployed condition.

The user input means 44 may be a user control in the form of a switch, a button, a gesture control sensor or detector, a resistive sensor, a capacitive sensor, or a pressure sensor. The user input means 44 is capable of receiving a user input, such as a gesture or touch, to operate, or actuate control of, the headrest 14 when the first supporting means 12 is in the retracted and/or deployed conditions. The control may be the deployment or retraction of the headrest 14, and/or adjustment of the headrest 14 to suit the user.

In one embodiment a single user input means 44 is provided to deploy, retract and/or adjust the headrest 14 when the first supporting means 12 is in the retracted condition and when the first supporting means 12 is in the deployed condition. In this embodiment, the user input means 44 is required to be visible irrespective of the condition of the first supporting means 12.

In other embodiments multiple user input means may be provided such that a first user input means is accessible to the user when the first supporting means 12 is in the retracted condition, to operate the headrest 14 when the first supporting means 12 is in the retracted condition, and a second user input means is accessible to the user when the first supporting means 12 is in the deployed condition, to operate the headrest 14 when the first supporting means 12 is in the deployed condition.

In some embodiments, where multiple user input means are provided, a first user input means is accessible to the user and a second user input means is inaccessible to the user when the first supporting means 12 is in the retracted condition. Further, the second user input means is accessible to the user and the first user input means is inaccessible to the user when the first supporting means 12 is in the deployed condition.

In some embodiments the user input means 44 may be provided by a mobile device, such as a mobile phone or smart watch, to effect operation of the headrest 14. In such an embodiment, the user may set the position of the first supporting means 12 and/or the headrest 14 to suit, prior to entering the vehicle 200.

Different combinations of the automated and semi-automated operations may be envisaged in various embodiments of the apparatus 10. In the example shown in FIGS. 7 and 8, a user detection means 40, a user input means 44 and a deployment detection means 46 are provided to effect the functions described above.

In FIG. 7 the first supporting means 12 is lowered to be in a deployed condition at a deployment location 42. Deployment detection means 46, in the form of a switch, has detected the first supporting means 12 to be in a deployed condition and has automatically actuated the headrest 14 to extend the headrest 14 to a deployed condition, exposing the storage means 16.

User input means 44, in the form of a switch control panel, is exposed by the deployment of the first supporting means 12 and can be operated by the user to effect control of the headrest 14, for example to place the headrest in a retracted, or partially retracted, condition. The switch control panel may for instance have a first switch to deploy the headrest 14 and a second switch to retract the headrest 14.

In absence of the deployment detection means 46, or if such means is deactivated on the vehicle 200, then the headrest 14 is not deployed upon deployment of the first supporting means 12. In such circumstances the user input means 44 may be operated by the user to effect control of the headrest 14, for example to place the headrest 14 in a deployed condition and to subsequently place the headrest 14 in a retracted condition.

In FIG. 8 the first supporting means 12 is raised to be in a retracted condition. Deployment detection means 46, in the form of a switch, does not detect the first supporting means 12 to be in a deployed condition and therefore does not automatically actuate the headrest 14 to extend the headrest 14 to a deployed condition. In FIG. 8, user detection means 40, in the form of a pressure sensor, is provided to automatically deploy the headrest 14 upon detection of a user in the seat at location 42 of the first supporting means 12. In FIG. 8, the user input means 44 is hidden from view and not able to be operated by the user. In an alternative embodiment, the user input means 44 could remain accessible to the user even when the first supporting means 12 is in the retracted condition.

In the embodiments shown, the same actuation mechanism 30 is used to effect deployment and retraction of the headrest 14 when the first support means 12 is in the retracted condition and when the first support means 12 is in the deployed condition.

Figure 9:
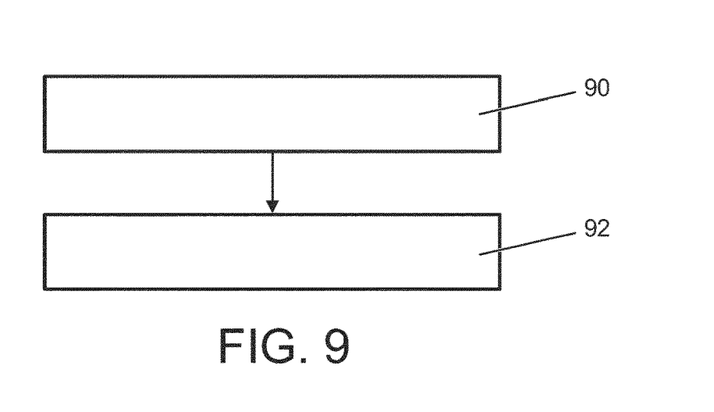
FIG. 9 illustrates an example method.

FIG. 9 illustrates a flow chart of an example method of deploying a storage means 16 for a vehicle 200. The method may in some examples be performed by the apparatus 10 for a vehicle seat 100.

The method of deploying a storage means 16 for a vehicle 200 comprises, at block 90, receiving a first user input to deploy a first supporting means 12, wherein the first supporting means 12 comprises a storage means 16.

At block 92 the method comprises receiving a second user input to deploy a second supporting means 14, wherein the second supporting means 14 is a headrest comprising a cover 18 for covering the storage means 16, and wherein the storage means 16 is at least partially uncovered in response to, or in dependence upon, the receipt of the second user input.

Of course, it will be understood that in some examples block 90 may be omitted. For example, should the first supporting means 12 have been previously deployed, then block 90 may be omitted from the method described in the preceding paragraphs. In which case the method may comprise receiving a user input to deploy a second supporting means 14, wherein the second supporting means 14 is a headrest comprising a cover 18 for covering storage means 16, the storage means 16 being comprised in a first supporting means 12, and wherein the storage means 16 is at least partially uncovered in response to, or in dependence upon, the receipt of the user input.

Figure 10:
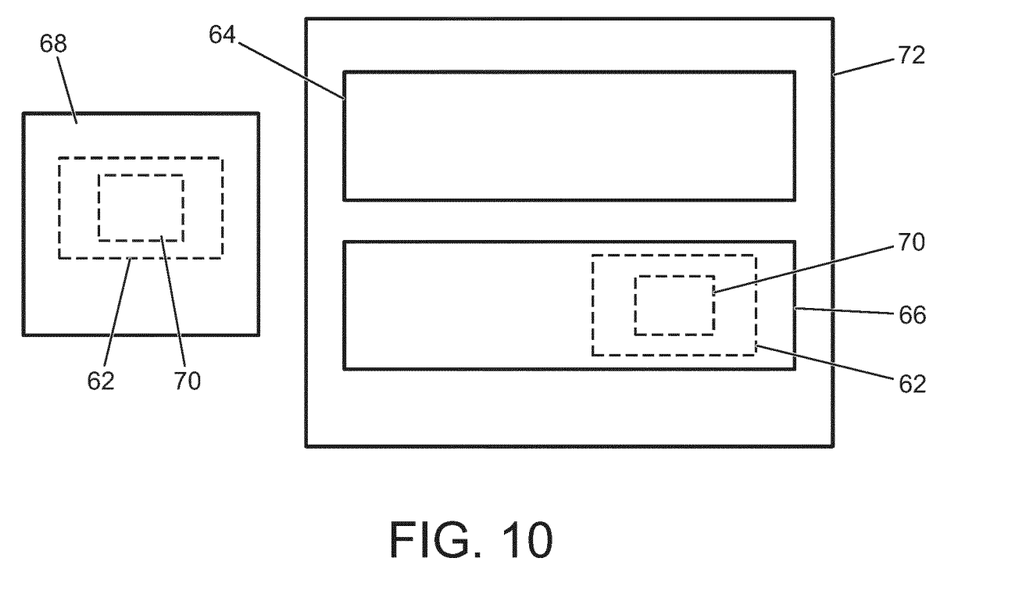
FIG. 10 illustrates an example controller.

FIG. 10 illustrates a computer program 62 comprising instructions 70 that, when executed by one or more processors 64, cause a system to perform, at least one of the aforementioned methods. In one example the system may be caused to perform, at least, receiving a first user input to deploy a first supporting means 12, wherein the first supporting means 12 comprises a storage means 16, and receiving a second user input to deploy a second supporting means 14, wherein the second supporting means 14 is a headrest comprising a cover 18 for covering the storage means 16, and wherein the storage means 16 is at least partially uncovered in response to, or in dependence upon, the receipt of the second user input. In one example the system may be caused to perform, at least, receiving a user input to deploy a second supporting means 14, wherein the second supporting means 14 is a headrest comprising a cover 18 for covering storage means 16, the storage means 16 being comprised in a first supporting means 12, and wherein the storage means 16 is at least partially uncovered in response to, or in dependence upon, the receipt of the user input.

FIG. 10 illustrates an example of a controller means 72 that may be a chip or a chipset. The controller means 72 may form part of one or more systems comprised in a vehicle 200. For example the controller means 72 may form part of a storage means deployment system, such as that illustrated in the examples of FIGS. 1 to 8.

Implementation of a controller means 72 may be as controller circuitry. The controller means 72 may be implemented in hardware alone, have certain aspects in software including firmware alone or can be a combination of hardware and software (including firmware).

As illustrated in FIG. 10 the controller means 72 may be implemented using instructions that enable hardware functionality, for example, by using executable instructions of a computer program 62 in a general-purpose or special-purpose processor 64 that may be stored on a computer readable storage medium (disk, memory etc.) to be executed by such a processor 64.

The processor 64 is configured to read from and write to the memory 66. The processor 64 may also comprise an output interface via which data and/or commands are output by the processor 64 and an input interface via which data and/or commands are input to the processor 64.

The memory 66 stores a computer program 62 comprising computer program instructions (computer program code) that controls the operation of the controller means 72 when loaded into the processor 64. The computer program instructions 70, of the computer program 62, provide the logic and routines that enables the apparatus to perform the method illustrated in FIG. 9. The processor 64 by reading the memory 66 is able to load and execute the computer program 62.

In one example, the controller means 72 comprises: at least one processor 64; and at least one memory 66 including computer program code, the at least one memory 66 and the computer program code configured to, with the at least one processor 64, cause the controller means 72 at least to perform, at least, receiving a first user input to deploy a first supporting means 12, wherein the first supporting means 12 comprises a storage means 16, and receiving a second user input to deploy a second supporting means 14, wherein the second supporting means 14 is a headrest comprising a cover 18 for covering the storage means 16, and wherein the storage means 16 is at least partially uncovered in response to, or in dependence upon, the receipt of the second user input.

In one example, the controller means 72 comprises: at least one processor 64; and at least one memory 66 including computer program code, the at least one memory 66 and the computer program code configured to, with the at least one processor 64, cause the controller means 72 at least to perform, at least, receiving a user input to deploy a second supporting means 14, wherein the second supporting means 14 is a headrest comprising a cover 18 for covering storage means 16, the storage means 16 being comprised in a first supporting means 12, and wherein the storage means 16 is at least partially uncovered in response to, or in dependence upon, the receipt of the user input.

As illustrated in FIG. 10, the computer program 62 may arrive at the controller means 72 via any suitable delivery mechanism 68. The delivery mechanism 68 may be, for example, a non-transitory computer-readable storage medium, a computer program product, a memory device, a record medium such as a compact disc read-only memory (CD-ROM) or digital versatile disc (DVD), or an article of manufacture that tangibly embodies the computer program 62. The delivery mechanism may be a signal configured to reliably transfer the computer program 62. The controller means 72 may propagate or transmit the computer program 62 as a computer data signal.

Although the memory 66 is illustrated as a single component/circuitry it may be implemented as one or more separate components/circuitry some or all of which may be integrated/removable and/or may provide permanent/semi-permanent/dynamic/cached storage.

Although the processor 64 is illustrated as a single component/circuitry it may be implemented as one or more separate components/circuitry some or all of which may be integrated/removable. The processor 64 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialised circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The blocks illustrated in FIG. 9 may represent steps in a method and/or sections of code in the computer program 62. The illustration of a particular order to the blocks does not necessarily imply that there is a required or preferred order for the blocks and the order and arrangement of the block may be varied. Furthermore, it may be possible for some blocks to be omitted.

In examples, the controller means 72 of FIG. 10 provides means for performing the method illustrated in FIG. 9, and as described herein.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. Apparatus for a vehicle seat, the apparatus comprising:
   a first support comprising a storage receptacle, a first end arranged to be operably connected to the vehicle seat, and a second end distal from the first end along a first axis;
   a second support that is a headrest comprising a cover for covering the storage receptacle, the headrest being arranged to have a deployed condition wherein the storage receptacle in the first support is at least partially uncovered and a retracted condition wherein the storage receptacle in the first support is covered by the cover, the headrest being arranged to be operably connected to the second end of the first support by a first connector parallel to the first axis; and
   a linear actuation mechanism including a first member, a second member and a motor, and wherein the first connector is operably connected to the first member of the linear actuation mechanism to provide linear movement of the first connector in the first axis by actuation of the motor connected to the second member of the linear actuation mechanism.

2. Apparatus for a vehicle seat according to claim 1, wherein the first connector comprises one or more of a rod pole, shaft or stem.

3. Apparatus for a vehicle seat according to claim 1, wherein when the headrest is in the deployed condition the headrest is extended from the first support along the first axis.

4. Apparatus for a vehicle seat according to claim 1, wherein the first support comprises a second connector, at the first end of the first support, arranged to operably connect the first support to the vehicle seat, and wherein the second connector is arranged to allow rotation of the first support about a second axis.

5. Apparatus for a vehicle seat according to claim 4, wherein the first support is arranged to have a deployed condition and a retracted condition, the first axis of the first support being substantially horizontal when in the deployed condition, and the first axis of the first support being rotated in the second axis between ninety degrees and one hundred and eighty degrees from the deployed condition, when in the retracted condition.

6. Apparatus for a vehicle seat according to claim 5, wherein in the deployed condition the first support provides support for a passenger's arm and in the retracted condition the first support provides support for a passenger's back.

7. Apparatus for a vehicle seat according to claim 5, wherein when the first support is in the retracted condition the headrest is deployed and/or adjusted by detection of a user input provided by a user via a user input device.

8. Apparatus for a vehicle seat according to claim 7, wherein the headrest is deployed and/or adjusted in dependence upon the detection, by user detection means, of a person being positioned at the location of the first support.

9. Apparatus for a vehicle seat according to claim 5, wherein when the first support is in the deployed condition the headrest is deployed and/or adjusted by detection of a user input provided by a user via a user input device.

10. Apparatus for a vehicle seat according to claim 9, wherein the headrest is deployed in dependence upon the detection, by deployment detection means, of the lowering of the first support towards or into the deployed condition.

11. Apparatus for a vehicle seat according to claim 5, comprising a sensor operable when the first support is in the deployed condition to prevent operation of the cover if an object is detected in the path of the cover.

12. Apparatus for a vehicle seat according to claim 1, wherein the storage receptacle comprises one or more of a beverage holder, a mobile phone caddy, a tray, and a wired or wireless charger for charging a mobile device.

13. A vehicle seat comprising the apparatus of claim 1.

14. A vehicle comprising the apparatus of claim 1.

15. Apparatus for a vehicle seat, the apparatus comprising:
a first support which comprises a storage receptacle;
a second support that is a headrest comprising a cover for covering the storage receptacle;
a first connector comprising one or more of a rod, pole, shaft or stem; and
a linear actuation mechanism comprising a first member and a second member, wherein the first member comprises an internally threaded member and the second member comprises an externally threaded member,
wherein
the headrest is arranged to be operably connected to the first support by the first connector, the first connector is operably connected to the first member of the linear actuation mechanism and the linear actuation mechanism is configured to provide linear movement of the first connector by actuation of a motor connected to the second member of the linear actuation mechanism; and
the headrest is arranged to have a deployed condition and a retracted condition, wherein in the deployed condition the storage receptacle is at least partially uncovered, and in the retracted condition the storage receptacle is covered by the cover.

16. Apparatus for a vehicle seat, the apparatus comprising:
a first support comprising
a storage receptacle;
a first end arranged to be operably connected to the vehicle seat;
a second end distal from the first end along a first axis; and
a second connector, at the first end of the first support, arranged to operably connect the first support to the vehicle seat and to allow rotation of the first support about a second axis;
the first support being arranged to have a deployed condition and a retracted condition, the first axis of the first support being substantially horizontal when in the deployed condition, and the first axis of the first support being rotated in the second axis between ninety degrees and one hundred and eighty degrees from the deployed condition, when in the retracted condition; and
a second support that is a headrest comprising a cover for covering the storage receptacle, the headrest being arranged to have a deployed condition wherein the storage receptacle in the first support is at least partially uncovered and a retracted condition wherein the storage receptacle in the first support is covered by the cover, the headrest being arranged to be operably connected to the second end of the first support by a first connector parallel to the first axis,
wherein
the headrest is deployed and/or adjusted by detection of a user input provided by a user via a user input device; and
when the first support is in the retracted condition, the headrest is deployed and/or adjusted in dependence upon the detection, by user detection means, of a person being positioned at the location of the first support; or
when the first support is in the deployed condition, the headrest is deployed in dependence upon the detection, by deployment detection means, of the lowering of the first support towards or into the deployed condition.

* * * * *